United States Patent [19]

Moore

[11] Patent Number: 4,804,403

[45] Date of Patent: * Feb. 14, 1989

[54] ATTRITION-RESISTANT, CONTROLLED RELEASE FERTILIZERS

[75] Inventor: William P. Moore, Hopewell, Va.

[73] Assignee: Melamine Chemicals, Inc., Donaldsonville, La.

[*] Notice: The portion of the term of this patent subsequent to Dec. 8, 2004 has been disclaimed.

[21] Appl. No.: 82,236

[22] Filed: Aug. 6, 1987

Related U.S. Application Data

[63] Continuation-in-part of Ser. No. 897,160, Aug. 18, 1986, Pat. No. 4,711,659.

[51] Int. Cl.$^4$ .......................... C05C 9/00; C05C 13/00
[52] U.S. Cl. .......................... 71/28; 71/29; 71/30; 71/64.11; 71/64.12
[58] Field of Search .................. 71/1, 28–30, 71/64.12, 64.13, 64.11, 93

[56] References Cited

U.S. PATENT DOCUMENTS

| | | | |
|---|---|---|---|
| 3,232,739 | 2/1966 | Belak | 71/28 |
| 3,252,786 | 5/1966 | Bozzelli et al. | 71/64 |
| 3,259,482 | 7/1966 | Hansen | 71/64 |
| 3,264,089 | 8/1966 | Hansen | 71/64 |
| 3,300,293 | 1/1967 | Bozzelli et al. | 71/28 |
| 3,342,577 | 9/1967 | Blouin et al. | 71/3 |
| 3,475,154 | 10/1969 | Kato | 71/64 |
| 4,120,685 | 10/1978 | Vargiu et al. | 71/30 |
| 4,711,659 | 12/1987 | Moore | 71/93 |

FOREIGN PATENT DOCUMENTS

| | | | |
|---|---|---|---|
| 2330847 | 1/1975 | Fed. Rep. of Germany | 71/64.12 |
| 0131062 | 5/1978 | Fed. Rep. of Germany | 71/64.12 |

OTHER PUBLICATIONS

CA 93(22):206283y, "Moisture Curable Coating Materials", 1980, Dupont.
CA 84:29810, J. Urea Fertilizer Coating, Hiroshi Takashima, Fusao Yamada; Japanese Kokai 75,129,362, Oct. 13, 1975.
CA 87:52162, U. Slow-Releasing Coated Granular Fertilizer, Toshiharu Yamazaki, Masao Eguchi, Yataka Takada, Hachiro Tadenuma, Kuniharu Nakajima, Sadashi Yamashita, Japanese Kokai 77,38,361, Mar. 24, 1977.

*Primary Examiner*—Ferris H. Lander
*Attorney, Agent, or Firm*—A. W. Breiner

[57] ABSTRACT

An attrition-resistant, controlled release fertilizer comprising a water-soluble central mass containing nucleophilic reactive functional groups surrounded and chemically bonded to a base coating formed by reacting a molecular excess of a coupling agent with the nucleophilic groups of the central particles, and a water-insoluble layer, surrounding and chemically bonded with the base coating, formed by the reaction and polymerization of the excess functional groups of the coupling agent used in forming the base coating is described. A preparation method is provided.

7 Claims, No Drawings

ATTRITION-RESISTANT, CONTROLLED RELEASE FERTILIZERS

RELATED APPLICATION

This application is a continuation-in-part of U.S. application Ser. No. 06/897,160 filed Aug. 8, 1986 now U.S. Pat. No. 4,711,659.

FIELD OF INVENTION

This invention relates to granular water-soluble plant foods and their controlled release as nutrients. More particularly, the invention relates to attrition-resistant, controlled release fertilizer compositions comprising the reacted moieties of a water-soluble central mass of plant food compound in particulate form containing reactive functional groups amounting to at least 10 percent (Component A), a monomer-type component having reactive functionality (Component B), and a material having reactive functionality which when reacted ultimately results in a water-insoluble polymeric sealing layer (Component C). The components are selected in order that the reactive functionality of monomer-type Component B will react with the functionality of each of Components A and C. The ratios of the components are selected in order that the monomer-type Component B is present in an amount sufficient to provide reactive sites for reaction with substantially all of the reactive functionality at the surface of particles of Component A and with the reactive functionality on Component C to form particles of the water-soluble central mass of plant food having a sealing layer of Component C, Components A and C being chemically linked together through the monomer-type Component B. Component B can be said to initially form a base coat on water-soluble mass component A.

Preferably the attrition-resistant, controlled release fertilizer comprises particles of a central mass of water-soluble fertilizer compounds containing amino groups, a base coating of substituted ureas chemically bonded to the central mass formed by reaction of the amino groups with a polyisocyanate; and a water-insoluble sealing layer chemically bonded to the base coating with the sealing layer formed by the reaction of organic polyols with excess functional groups of the polyisocyanates from the base coat substituted urea formation.

DESCRIPTION OF THE PRIOR ART

Rapid release of water-soluble plant food in soils containing plants may cause phytotoxicity to the plants, and/or the early depletion of the plant food by leaching. Plant food researchers for a long time have attempted to develop plant food particles which release nutrients at a rate about equal to their uptake by plants to minimize phytotoxicity and maximize plant food use efficiency. Improved release control has been achieved primarily with nitrogen in the form of urea, by substantially reacting it with aldehydes to form insoluble products such as ureaform, which must chemically decompose in the soil before the nitrogen becomes available for utilization by plants. Another method consists of physically coating fertilizer granules with solidified water-insoluble melts. Various materials have been used as coatings, including sulfur, paraffin waxes, and plastics. These coatings must be broken down by erosion, internal vapor pressure, microbes, or attrition before the contained nutrients become available.

Unfortunately, attrition in producing, storing, handling, and applying the coated products prematurely breaks down the coatings causing substantial loss of release control, phytotoxic problems, and excessive nutrient leaching. Related problems and disadvantages associated with these coated products are that as a result of the coating the nitrogen, depending on the type of coating used, is not available for plant uptake in a reasonable time period, or the nitrogen release rate is still sufficiently high so as to cause phytotoxic problems when substantial amounts of the fertilizers are applied. Additionally, since there is no direct chemical bonding between the plant food and the coating material, the release rate of the plant food is not rigidly controlled as a result of cracking of the coatings or the like, leading to the uncontrolled release of the plant food.

Although many efforts have been made heretofore to provide improved coating techniques so as to accurately control the release rate of the plant food, it has not been possible to provide a material completely free from the above-noted shortcomings. It has long been an object of those skilled in the art, therefore, to produce controlled release fertilizers having substantial resistance to attrition from shipping, handling, and application by applying economically small amounts of coating material to the fertilizers and wherein the rate of fertilizer release is consistently controlled.

PRIMARY OBJECTS OF INVENTION

It is, therefore, a primary object of this invention to provide new coated fertilizer particles which release soluble fertilizer nutrients in a slow and controlled manner even with the use of small amounts of coating material.

It is another primary object of this invention to provide coated fertilizer particles with coatings so securely bonded to the soluble fertilizer that little, or no, attrition occurs and release control is maintained even when the coated particles receive severe vibration and abrasion through repeated rough handling.

It is a further primary object of this invention to provide an effective method for preparing these attrition-resistant, controlled release coated fertilizer particles.

SUMMARY OF THE INVENTION

Controlled release fertilizer particles which have remarkably high resistance to attrition and a method for their preparation are provided by bonding a water-soluble central mass of plant food compound in particulate form containing reactive functional groups, such as nucleophilic groups, with a water-insoluble polymeric coating or sealing layer, with the bonding occurring through a coupling agent. In this manner the fertilizer composition in particulate form comprises a water-soluble central mass containing releaseable nitrogen or other plant nutrient, and a water-insoluble sealing layer surrounding and chemically bonded to the water-soluble mass through a coupling agent. The coupling agent strongly connects itself to the water-soluble central mass to form generally a base coat, with the base coat then bonding to a water-insoluble coating or sealing layer so that the coated fertilizer particle is highly resistant to attrition even under conditions of extreme vibration, impact, and abrasion. The strong connection of the coupling agent is achieved by the chemical reaction of functional groups on the coupling agent, such as an isocyanate group of a liquid polyfunctional isocyanate, with, in a preferred embodiment, the nucleophilic functional groups such as $NH_2$ groups at, and near, the surface of the water-soluble central mass, to form a complex such as substituted ureas which are integral parts of the central mass and the base coating.

The coupling agent, or base coating, is then surrounded and chemically bonded to a water-insoluble sealing layer which provides a barrier to moisture penetration and the release of the soluble fertilizer from the central mass of the particle. The sealing layer is formed by reacting a material also having reactive functional groups, such as an organic polyol, with the coupling agent, such as the polyfunctional isocyanate, thus chemically bonding the sealing layer with the base coating and, in turn, with the watersoluble central mass.

The method for the preparation of the fertilizer particles requires surrounding and chemically bonding particles of water-soluble fertilizer compounds containing functional groups, such as nucleophilic groups, with a water-insoluble polymeric coating or sealing layer, through a coupling agent containing functional groups reactive with functionality on the water-soluble central mass and the material making up the water-insoluble coating or sealing layer. In a preferred embodiment where the water-soluble central mass contains $NH_2$ functionality, the central mass is reacted with a coupling agent to form a base coating consisting of substituted ureas by applying a molecular excess of liquid polyfunctional isocyanate to a mobile mass of the particles of fertilizer at a temperature between 30° C. and 160° C., and holding for a period of time between one and 60 minutes. Then the base coating is surrounded and chemically bonded with a water-insoluble sealing layer by reaction and polymerization of the remaining functionality of the polyfunctional isocyanate of the coupling agent with an amount of anhydrous organic polyol to produce an isocyanate (NCO) to hydroxyl (OH) moiety ratio between one and three, by applying the polyol to a mobile mass of the base coated particles at a temperature between 60° C. and 160° C., and holding for a period of time between one and 60 minutes.

The invention, as will be fully apparent from the following description, relates to attrition-resistant, controlled release fertilizer compositions comprising as Component A a water-soluble central mass of plant food compound containing functional groups amounting to at least 10% which can be any of a variety of materials including urea, ureaform, alkylurea, biurets, guanidine, melamine, amino acids, proteins, methanol ureas, ethanolamines, ammonia compounds, nitrogen-containing polyols, monoammonium phosphate, diammonium phosphate, ammonium polyphosphate, monopotassium phosphate, dipotassium phosphate, potassium bicarbonate, ammonium sulfate, potassium bisulfate, potassium formate, potassium acetate, potassium diacetate, and a material containing elemental sulfur. The coupling agent, which is Component B, must have functional groups which are reactive with the functional groups on the water-soluble central mass of plant food and also have functional groups for reacting with a coating material. The coupling agent, therefore, can be a polyisocyanate, terephthalic acid, adipic acid, maleic anhydride, methyl terephthalic acid, or a prepolymer of a polyisocyanate and polyol. A water-insoluble coating is provided by reacting Component C with the remaining functionality on Component B and can be an anhydrous organic polyol, as above stated, or it can be based on caprolactam, epichlorohydrin, propylene oxide, ethylene oxide, styrene oxide, hexamethylene tetramine, and natural and synthetic polysaccharides; as well as prepolymers containing unreacted epoxy groups, or phenol formaldehyde resins carrying functionality reactive with the selected coupling agent.

GENERAL DESCRIPTION OF THE INVENTION

The attrition-resistant, controlled release fertilizer particle composition of this invention contains a water-soluble central mass of plant food. The plant food is a chemical compound, or compounds, normally used for plant nutrition. This central mass must contain at least about 10 percent reactive functional groups, such as nucleophilic groups, to provide the reaction sites for chemically bonding to a coupling material. The water-soluble central mass of plant food can be any of the various materials having plant food values such as materials containing potassium, phosphorus, nitrogen, and sulfur. It is essential, however, that the material have reactive functionality available at the surface of the mass for reaction with a coupling agent. Useful materials include compounds containing $NH_2$ (amino) functionality such as urea, substituted ureas including ureaform and alkylurea; biurets, guanidine, melamine, amino acids, proteins, methylolureas, ethanolamines, and ammonia compounds; compounds having OH (hydroxyl) functionality and plant food value, such as the nitrogen-containing polyols, and the plant food materials monoammonium phosphate, diammonium phosphate, ammonium polyphosphate, monopotassium phosphate, dipotassium phosphate, potassium bicarbonate, ammonium sulfate, and potassium bisulfate. Plant food materials containing carboxyl functionalities such as potassium formate, potassium acetate and potassium diacetate, and elemental sulfur can also be used. The reactive functionality, such as nucleophilic groups, as above stated must be present in an amount of at least about 10 percent to provide the necessary reaction sites. The percent of nucleophilic functionality preferably is at least 23 percent, and more preferably in the range of 23 to 60 percent. All percents used throughout this disclosure are by weight unless otherwise specified.

The coupling agent reacts at the surface of the water-soluble mass to form what can be considered a base coating which surrounds and chemically bonds to the central mass, and then reacts with a second material to form a water-insoluble coating. The coupling agent can be any monomeric-type material having at least two functional groups available for coupling. In this context, monomer-type component or monomeric-type material includes those materials having the necessary functionality and includes compounds, low molecular weight polymers, and the like. The available functionality must be selected so that it will react with the reactive functionality, such as a nucleophilic group on the water-soluble central mass and also with the functionality of the component providing the water-insoluble coating. Materials which can be used, depending upon the functionality on the water-soluble mass and the component forming the water-insoluble coating, can be a polyfunctional isocyanate, as illustrated by diphenylmethane diisocyanate; a polycarboxylic acid compound, as illustrated by terephthalic acid, and adipic acid, as well as the amino-substituted carboxyl groups; an anhydride of a polycarboxylic acid, as illustrated by maleic anhydride; an alkylated polycarboxylic acid, as illustrated by methyl terephthalate; and the like. In the event the water-soluble central mass contains amino functionality, and the coupling agent is a polyisocyanate, the base coating consists of substituted ureas formed by reacting a molecular excess of the polyfunctional isocyanate with the $NH_2$ groups of the central mass. The chemical bond is formed by the penetration of the isocyanate at and near the surface of the central mass to react with the $NH_2$ groups available there. A molecular excess of the coupling agent such as the isocyanate means that sufficient functionality, such as NCO (isocyanate) groups, are present to react with all the reactive groups available at the surface of the central mass, and to provide sufficient unreacted groups to form a chemical bond with the sealing layer.

The water-insoluble sealing layer which surrounds and chemically bonds to the base coating is formed by the reaction and polymerization of the excess polyfunctional isocyanate of the coupling agent or base coating with an amount of material sufficient to form a water-insoluble coating or sealing layer. In the event the coupling agent is a polyisocyanate, a preferred sealing material is an anhydrous organic polyol in an amount sufficient to produce a ratio of NCO to OH groups between one and three. Other materials which can be utilized in forming the water-insoluble sealing coating are those materials having sufficient reactive functionality to react with the functionality of the coupling agent. These materials include polyester resins containing hydroxyl and amino groups reactive with the coupling agent illustrated by polyols obtained as distillation bottoms in the recycle recovery of fiber grade glycol in the production of polyethylene terephthalate polyesters, blended with triethanolamine; materials containing formaldehyde or amino-formaldehyde functionality illustrated by monomethylolurea, methylene diurea, and polymethyleneureas; as well as reactive components containing substituted urea linkages. Other materials which are suitable for reacting with the coupling agents to form water-insoluble sealing layers include caprolactam, epichlorohydrin, propylene oxide, ethylene oxide, styrene oxide, hexamethylene tetramine, and natural and synthetic polysaccharides.

It has been found that the rate of fertilizer release from the central mass can be further reduced without decreasing attrition resistance by use of a particle composition having between one and ten or more water-insoluble coatings surrounding the sealing layer. More than five coatings allowed essentially no release of nutrients after exposure to water. It was found that these water-insoluble coatings were effective when they amounted to between 0.5 and 5.0 percent of the fertilizer particles. Lower amounts did not appreciably decrease water penetration, and higher amounts caused a decrease in the coating strength and resistance to attrition.

It has also been found that the water-insoluble coating, either as the coating itself or as a component or additive to the coating, can be an efficient way to distribute with the food plant, herbicides, insecticides or fungicidal materials, or to supplement the fertilizer with less soluble fertilizer components to provide for prolonged effectiveness. For example, the water-insoluble coating can be further coated with an a herbicide such as hexazinone, or it can be coated with a material which will provide fertilizer particles with enhanced food value such as an s-triazine exemplified by melamine. It is also possible to provide a colorant to the water-insoluble coating to provide an indicator of the assimilation of the fertilizer into the soil.

To achieve the desired chemical bond between the base coating and the central mass of soluble fertilizer, it is necessary that the coupling agent, such as the polyfunctional isocyanate used in the composition, be fluid at the time of reaction and preferably have a kinematic viscosity lower than 200 centipoise at 25° C. and preferably between 60 and 120; and that it be chemically reactive at relatively low temperatures, i.e., at temperatures below about 160° C., and preferably in the range of 30° C. to 110° C., and more preferably in the range of 90° C. to 100° C. Coupling agents most effective are those having a reactive functional group content between 10 and 60 percent, and preferably between 25 and 45 percent.

The amount of coupling agent utilized to form the base coating is generally critical to the attrition resistance of the coated particle. It was found that the coupling agent preferably is between 0.03 and 10 percent of the total fertilizer particle. Lower amounts will not produce a satisfactory bond, while larger amounts are difficult to apply in a practical manner and are costly.

It has been found that the fertilizer particles of this invention can be readily combined into a mass for practical use as a commercial fertilizer in bulk or bagged form. It was further found that the mass of these particles require no conditioning, such as adding diatomaceous earth, to make them free flowing and storage stable for long periods of time without agglomerating.

A particularly effective fertilizer particle composition of this invention, especially useful as a commercial controlled release fertilizer, comprises a central mass of urea containing between 26 and 53 percent $NH_2$ functional groups; a base coating, surrounding and chemically bonded to the central mass, formed by reacting a molecular excess of polymeric diphenylmethane diisocyanate, amounting to between 0.5 and 1.5 percent of the fertilizer particle and containing between 30 and 33 percent NCO, with the $NH_2$ functional groups from the central mass of urea; a water-insoluble sealing layer surrounding and chemically bonded to the base coating, formed by the reaction and polymerization of the excess polymeric diphenylmethane diisocyanate of the base coating, with an amount of polyalkyleneterephthalate polyester polyol to produce an NCO to OH moiety ratio between 1.1 and 1.8, with the polyol containing between 5 and 15 percent trialkanolamine and less than 0.1 percent water, and exhibiting a hydroxyl number between 225 and 350; and between 1 and 5 water-insoluble coatings surrounding the sealing layer with each coating amounting to between 0.5 and 1.5 percent of the fertilizer particle, the coatings consisting of layers of polymeric diphenylmethane diisocyanate and polyalkyleneterephthalate polyester polyol applied in alternate layers to produce an NCO to OH moiety ratio in the water-insoluble coatings between 1.0 and 1.5.

It was found that polyethyleneterephthalate polyester polyols exhibiting a hydroxyl number between 275 and 325 and a kinematic viscosity between 12,000 and 16,000 centipoise at 25° C. were particularly effective polyalkyleneterephthalates for the instant composition. It was further found that this material reclaimed as still-bottoms, and by other methods, in the production of polyesters for plastics or fibers, was an economical and effective polyol for use in the instant invention.

An effective method by which the particulate fertilizers of this invention can be prepared comprises surrounding and chemically bonding particles of water-soluble fertilizer materials, preferably consisting of urea, biuret, guanidine, ureaform, alkylurea, melamine and ammonia compounds, containing at least 10 percent, and preferably between 26 and 53 percent, NH$_2$ functional groups, with a base coating, consisting of substituted ureas by applying a molecular excess of liquid polyfunctional isocyanate, preferably between 0.5 and 1.5 percent of polymeric diphenylmethane diisocyanate containing between 30 and 33 percent NCO, to a mobile mass of the particles of fertilizer at a temperature between 30° C. and 160° C., preferably between 80° C. and 120° C., and holding for a period of time between one and 60 minutes, preferably between two and ten minutes.

It has been found that several practical methods may be used to create the mobile mass of particles of fertilizer for applying the base coating and sealing layers of this invention, and that the method may be carried out batchwise or continuously. A rotary drum was found to work satisfactorily. When this apparatus was used in a continuous manner, it was necessary that it be operated so that there was little backmixing as the reactants passed through the rotary drum. Further, it was necessary that polyfunctional isocyanate and the anhydrous polyol be sprayed onto the particles through multiple addition points in the order required to produce the base coating, the sealing layer, and the water-insoluble coatings. It was also found possible to perform the method of this invention in fluid beds. When operating continuously, the fluid beds were operated in series, with one reactant added in each of the continuous fluid beds.

When the base coating has been completed, the method may be continued by surrounding and chemically bonding the base coating with a water-insoluble sealing layer by reaction and polymerization of the excess polyfunctional isocyanate, preferably diphenylmethane diisocyanate, of the base coating with an amount of anhydrous organic polyol, preferably polyalkyleneterephthalate polyester polyol, to produce an NCO to OH moiety ratio between 1 and 3, preferably between 1.1 and 1.8. It has been found that best results are obtained when the polyol contains between 1 and 15 percent of a reaction catalyst and less than 0.1 percent water and has a hydroxyl number between 225 and 350. Suitable reaction catalysts were found to be alkanolamines, melamine, alkylamines, tin octoate, and iron octoate. The surrounding and chemically bonding of the base coating with a water-insoluble sealing layer is carried out by applying the polyol to a mobile mass of base coated particles at a temperature between 60° C. and 160° C., preferably 80° C. to 120° C., and holding for a period of time between one and 60 minutes, preferably between two and ten minutes.

The method of this invention provides for the addition of more resistance to water penetration, if desired. This is accomplished by surrounding the sealing layer with between one and five water-insoluble coatings, with each coating amounting to between 0.5 and 1.5 percent of the fertilizer particle, by applying alternate layers of polyfunctional isocyanate, preferably diphenylmethane diisocyanate, and anhydrous polyalkyleneterephthalate polyester polyol to produce an NCO to OH moiety ratio between 1.0 and 1.5, to a mobile mass of the fertilizer particles at a temperature between 100° C. and 150° C., and holding for a period of time between two and ten minutes.

It has also been found that it is possible to include substantial amounts of diluent fillers in the sealing layer or the water-insoluble coatings as long as the composition and method of the instant invention is adhered to. Inert powders uch as Wollastonite, lime, silica, dolomite, and rouge may be used as diluent fillers to reduce the consumption of the polyfunctional isocyanates and polyols while retaining the resistance to attrition and controlled nutrient release.

Finely divided plant nutrients, particularly those chemicals known as micronutrients, may also be used effectively as diluent fillers in the sealing layer and water-insoluble coatings. Some of the micronutrients found to be particularly suitable for inclusion as diluent fillers are oxides and sulfates of zinc, copper, manganese, and iron.

Agricultural chemicals which affect the performance of growing plants may also be included in finely divided form as diluent fillers, or as a part of the water-insoluble coating, or as a coating over the water-insoluble coating. Some of the agricultural chemicals found to be particularly effective include herbicides, hexazinone, 2,4-D, and atrazine.

It was found that the diluent fillers may be applied by blending with the polyols and applying the combination as a liquid dispersion. Where the diluents are finely divided dry powders, it was found that they may be applied between the base coat and the sealing layer, between the sealing layer and the water-insoluble coating, and between the water-insoluble coatings with each layer of powder applied prior to the application of polyol. Application is made by adding the dry powder diluent to a mobile mass of coated particles to which additional layers of polyfunctional isocyanates and organic polyols are added to react according to the instant invention.

It is preferable to limit the amount of diluent filler used to no more than two times the weight of the polyol used in forming the granule, and the amount more preferably is limited to a weight equal to that of the polyol to obtain excellent attrition resistance.

Several different diluent fillers may be employed in several sequential layers of a single particle or mass of particles. Thus, it was found possible to carry diluents of inerts, herbicides, and nutrients in a given particle or particles.

Although the invention is primarily directed to a composition including a water-insoluble sealing layer on the composite of the water-soluble central mass of plant food compound and coupling agent, the intermediate material made by reacting the water-soluble central mass and coupling agent so as to contain residual functionality is a valuable intermediate composition. Thus, this intermediate composition can be utilized as a means of providing a fertilizer, i.e., the water-soluble central mass, containing an auxiliary agricultural component such as a herbicide, a fungicide, an insecticide, or the like through reaction of the intermediate with the agricultural component. Additionally, the intermediate offers a convenient means for providing a fortified fertilizer particle through reaction of the intermediate composition with, for example, melamine to provide increased fertilizer value and increased control of the release of a plant nutrient.

In the aforesaid disclosure it is to be understood that the term "polyfunctional isocyanate" is used to define aliphatic, aromatic, and aliphatic aromatic polyisocyanate compounds generally known as polyisocyanates. These compounds contain two or more NCO groups available for reaction, and are widely used in the production of polyurethane polymers.

The term "organic polyol" is used to define organic compounds containing two or more OH groups located on an aliphatic or aromatic carbon skeleton. Because of the nucleophilic nature of the OH groups, these compounds may be readily reacted and polymerized with the electrophilic polyfunctional isocyanates. The organic polyols used in the instant invention must be substantially anhydrous when the coupling agent is a polyisocyanate. Any water present reacts with the isocyanates to produce carbon dioxide gas, thereby blowing perforations through the sealing layer and allowing higher than desired moisture penetration of the sealing layer. It has been found that the use of low molecular weight polyols, such as ethylene or propylene glycols, or blended polyols containing substantial amounts of low molecular weight polyols also cause the generation of some carbon dioxide and creates less effective sealing layers.

The term "substituted urea" is used to define compounds such as RNHCONHR' formed by the reaction of the NCO group in RNCO with the $NH_2$ group of $R'NH_2$. The substituted ureas are solids exhibiting limited water solubility. They are generally too soluble to protect the central soluble mass of plant food from dissolution by water. These ureas, however, form a very strong physical and chemical bond between the soluble central mass and the water-insoluble sealing layer. The exact reason for this exceptionally strong bond is unknown, but it is thought to be related to the chemical similarity of the substituted ureas to both the $NH_2$ groups of the central mass and the isocyanate-based polymers in the sealing layer.

It was also found that the composition of this invention had the desired properties of attrition resistance and controlled nutrient release when the organic polyol of the water-insoluble sealing layer was selected from aliphatic, aromatic, and aliphatic aromatic polyether and polyester compounds, or their mixtures, which terminate in two or more OH groups. These polyols may be simple polyethers, such as those produced by the reaction and polymerization of ethylene oxide with ethylene glycol, or complicated ones involving reactions and polymerizations of aromatic groups, and amine terminating groups. The polyesters may be simple ones, such as those formed by the reactions and polymerization of ethylene glycol with terephthalic acid or complicated ones containing additional monomers. Additionally, it was found that a mixture of polyethers and polyesters could be used effectively as the organic polyols. To secure a satisfactory sealing layer, it was necessary that the polyols contain less than 0.1 percent water and exhibit hydroxyl numbers between 200 and 400. Polyols outside that range produced perforated seals or reacted slowly and incompletely with the isocyanates.

It was found that the strength of the sealing layer was increased when between one and 20 percent reaction catalysts were included in the organic polyols. Materials found to catalyze the reaction of the polyols to form an effective sealing layer included alkanolamines, melamine, alkylamines, tin octoate, and iron octoate.

The supply of a plant nutrient such as $NH_2$ in the central water-soluble mass of the fertilizer compounds is critical to the instant invention. Urea, biuret, guanidine, ureaform (methylene urea polymer), melamine, and ammonia compounds were found to supply satisfactory amounts of $NH_2$ groups when used as a simple granule or when combined with other plant nutrients to form a composite granule containing the necessary amounts of $NH_2$. Other plant nutrients such as potassium, phosphorus, and sulfur can replace part or all of the nitrogen-containing material.

The method of preparation is important in securing an effective attrition-resistant, controlled release particle composition. For example, it was not possible to obtain the secure chemical bond between the base coating and the central mass of soluble fertilizer by dissolving a water-insoluble resin such as a polyurethane in an organic solvent, applying that liquid to the particle, and evaporating the solvent. It was also not possible to obtain such a secure bond by applying a molten thermoplastic material such as wax, polyethylene, or polystyrene to the soluble particle and cooling. Further, it was not possible to simply add preformed substituted ureas to the central soluble particle mass to produce the strong base coat. It was necessary that these substituted ureas be formed in situ. The failure of the aforesaid methods is because the central mass is not chemically bonded to the base coating and the base coating is not bonded to the water-insoluble coating.

The above description of the invention has been directed in part primarily to the utilization of a water-soluble mass carrying amino groups as the nucleophilic functional group. It will be apparent, however, that the same considerations apply when the water-soluble mass carries different nucleophilic functional groups. The invention has also been described primarily in reference to using a polyisocyanate as the coupling agent. It will again be understood that the same considerations apply when using coupling agents having other or a combination of different functional groups. Finally, the invention has been described primarily with reference to the use of a polyol in the formation of the water-insoluble coating or sealing layer. It will again be understood that the same consideration apply when a different water-insoluble coating or sealing layer is utilized. The critical feature, as stated hereinbefore, is the utilization of a water-soluble central mass having plant food value, and a material which will react to form a water-insoluble coating or sealing layer which are compatible with and reactive with the functional groups of the coupling agent in order that the central water-soluble mass chemically bonds through the coupling agent to the water-insoluble coating agent.

PRESENTLY PREFERRED MODES OF OPERATION OF INVENTION

Having described the basic concepts of the instant invention, reference is now made to the following examples which are provided to illustrate the presently preferred embodiments, including the preferred methods of preparation, and comparative evaluations with prior art compositions.

EXAMPLE 1

A sample of $-6+14$ U.S. Standard Mesh Screen Size granular fertilizer particles was prepared which was composed of water-soluble central masses (granules) of urea, containing 53 percent $NH_2$ functional groups; and a base coating, surrounding and chemically bonded to the central mass, consisting of the substituted ureas resulting from the reaction of 1.3 percent (by weight of the granular fertilizer particles) polymeric diphenylmethane diisocyanate with the $NH_2$ functional groups at the surfaces of the central masses of the urea particles. The polymeric diphenylmethane diisocyanate, sometimes designated as isocyanic acid, polymethylene polyphenylene ester, was a liquid containing about 65 percent diphenylmethane diisocyanate (commonly abbreviated as MDI) and about 35 percent of higher oligomers of MDI, having a kinematic viscosity at 25° C. of 80 centipoise, an average molecular weight of 350, a specific gravity of 1.24, and an isocyanate (NCO) functional group concentration of 31.9 percent. There was sufficient polymeric diphenylmethane diisocyanate so that all of the NCO functional groups were not reacted by the $NH_2$ groups at the surface of the urea granules while forming the base coating.

The sample composition included a water-insoluble sealing layer, surrounding and bonded to the base coating, which layer was formed by the reaction and polymerization of the excess diphenylmethane diisocyanate of the base coating with a polyethyleneterephthalate polyester polyol which provided one OH group (moiety) per 1.3 NCO group (moiety) used in preparing the base coating. The polyol used was a byproduct recovered as still-bottoms in the recovery of glycols from polyester production from glycols and terephthalic acid. Moisture content was less than 0.1 percent, free diethylene glycol content was 8 percent, and the hydroxyl number of the polyol was 319. The polyol contained 10 percent triethanolamine as reaction-polymerization catalyst. The total weight of the base coating and sealing layer was 3 percent of the granular fertilizer particles.

Examination of the individual particles with a 200 power laboratory microscope showed the base coatings and the sealing layers to be continuous, smooth, and completely attached to the central particles, with no visible holes or cracks.

EXAMPLE 2

Microscopic examination was made of two samples of $-6+14$ mesh granules of coated urea. The first was coated with 18 percent elemental sulfur, prepared by applying molten sulfur, cooling, sealing with 0.6 percent polyethylene in bright oil, then conditioned with 1.1 percent fine diatomaceous earth powder. The second was prepared by spraying on layers of polyurethane polymer dissolved in a volatile hydrocarbon solvent. The total amount of urethane resin applied amounted to 5 percent by weight.

The sulfur coated urea was observed to contain a large number of cracks, and areas of lumps or thick sulfur coats.

The urethane coated urea particles were found to contain areas where the coating was unattached and not in contact with the central urea particle. The coatings contained a substantial number of bubbles and some holes created by the escaping solvent vapors.

EXAMPLE 3

Samples amounting to 500 grams each of the Example 1 composition, and the sulfur and urethane coated urea granules of Example 2 were tested for resistance to attrition and were placed in a 6-inch diameter by 8-inch long porcelain laboratory ball mill containing 40 steel balls, about one centimeter in diameter, and allowed to roll for twenty minutes at 100 rpm, providing a high degree of abrasion and impact. At the end of the test period, the sample granules were removed and attrition was measured by screening in a vibratory shaker for five minutes. The amount of material passing through a 16-mesh screen from each sample was weighed. No appreciable amount of fines was produced from the composition of Example 1. The fines from the sulfur coated urea and the urethane coated urea amounted to 7.2 to 1.8 grams, respectively.

EXAMPLE 4

Samples from the attrition resistance test of Example 3, each amounting to 25 grams, were placed in 100 grams of water and stored for 24 hours at 100° C. in a quiet closed bottle. The amounts of urea dissolved from the composition of Example 1, the urethane coated urea, and the sulfur coated urea were 7.1, 43.6, and 78.3 percent, respectively.

EXAMPLE 5

To a laboratory rotary drum coater, 24 inches in diameter, 10 inches long, fitted with fifteen slanted lifts to induce particle rolling, 4000 grams of $-4+6$ mesh granular urea particles containing 52 percent $NH_2$ groups were added and rotation of the drum at 30 rpm was initiated. A base coating surrounding and bonded to the urea was formed by spraying 1.0 percent of liquid polymeric diphenylmethane diisocyanate containing 30 percent NCO and consisting of 50 percent diphenylmethane diisocyanate (MDI) and 50 percent of higher oligomers of MDI onto the surfaces of the mobile mass of urea granules in the coater at 110° C., and allowed to react and produce substituted urea for a period of two minutes. The molecular excess of unreacted NCO groups remaining on the outer surface of the base coating made the particle slightly tacky at this intermediate stage of the method.

To produce a sealing layer on the base coating, the rotation of the coating drum was continued and onto the mobile mass of particles in the drum was sprayed 1.5 percent of a polyol which was preheated to 80° C. to improve its reactivity and spread rate over the granules. The polyol consisted of scrap terephthalate polyester plastic bottles, ground and dissolved by refluxing in triethylene glycol. This economic polyester polyol had a hydroxyl number of 240 and contained 9 percent triethylene glycol and less than 0.1 percent water, and exhibited a viscosity of 13,800 centipoise at 25° C. Prior to its use, 10 percent triethanolamine was added as a reaction and polymerization catalyst to the polyol. The sealing layer was formed by holding the temperature of coated particles at 112° C. for two minutes. About half of the particles were discharged hot from the coating drum, and were found to be hard and very resistant to attrition and water dissolution.

EXAMPLE 6

Two-thousand grams of the product from Example 5 was retained in the rotary drum, and alternate layers of the diisocyanate and polyols of Example 5 were sprayed onto the mass of sealing layer coated urea particles at 120° C. Each two applications were allowed to polymerize for four minutes before another series of sprays was applied. Each series of sprays contained 1.0 percent of the diisocyanate and 1.4 percent of the polyol. Two series of water-insoluble coatings were applied over the sealing layer, giving a total coating of 7.3 percent coating.

Microscopic inspection of the coated granules showed them to be substantially free of holes, bubbles, and cracks. Each coating appeared to be substantially a part of the coating which it covered, and there were no voids between the central urea particles and the coatings.

EXAMPLE 7

The product from Example 6 was given the attrition test of Example 3 and less than 0.1 gram of fines were produced. A 2000 gram sample of polyurethane coated urea was prepared by coating −4+6 mesh urea with four layers each amounting to 2 percent polyurethane polymer, by application as a hydrocarbon solution and evaporating the solvent from each layer. A 2000 gram sample of the same urea granules was coated with 28 percent elemental sulfur with 0.5 percent sealer and 1.0 percent conditioner. Samples of the sulfur and urethane coated urea granules were given the attrition test of Example 3, and attrition amounted to 4.7 and 1.1 grams, respectively.

EXAMPLE 8

The samples given the attrition resistance tests of Example 8, after discarding the fines, were given the water dissolution test of Example 4, except in this test the coated granules were allowed to stand for seven days before the amount of urea dissolved out of the granules was measured. Only 7.4 percent of the urea in the granules produced in Example 6 dissolved, compared with 47.7 percent of the urethane coated urea and 61.1 percent of the sulfur coated urea of Example 7.

EXAMPLE 9

Example 5 was repeated using, as the central soluble mass, −6+14 mesh particles of co-granulated urea and melamine containing 45 percent melamine and 55 percent urea, and the two additional series of water-insoluble coatings were added as in Example 6, producing a total coating of 7.5 percent. Microscopic inspection showed the seal of the coating to be complete, and the seven-day water dissolution test of Example 8 showed the total nitrogen dissolved was equivalent to 3.8 percent of the contained urea.

In the above examples illustrating the present invention, the water-soluble central mass can be replaced by other plant food containing materials including ureaform, alkylurea, biurets, guanidine, melamine, amino acids, proteins, methanol ureas, ethanolamines, ammonia compounds, nitrogen-containing polyols, monoammonium phosphate, diammonium phosphate, ammonium polyphosphate, monopotassium phosphate, dipotassium phosphate, potassium bicarbonate, ammonium sulfate, potassium bisulfate, potassium formate, potassium acetate, potassium diacetate, and a material containing elemental sulfur. Additionally, the coupling agent can be replaced by terephthalic acid, adipic acid, maleic anhydride, methyl terephthalic acid, or a prepolymer of a polyisocyanate and polyol. The water-insoluble sealing layer which surrounds and chemically bonds to the base coating can be based on caprolactam, epichlorohydrin, propylene oxide, ethylene oxide, styrene oxide, hexamethylene tetramine, and natural and synthetic polysaccharides; as well as prepolymers containing unreacted epoxy groups, or phenol formaldehyde resins carrying functionality reactive with the selected coupling agent.

As will be apparent to one skilled in the art, various modifications can be made within the scope of the aforesaid description. Such modifications being within the ability of one skilled in the art form a part of the present invention and are embraced by the appended claims.

It is claimed:

1. An attrition-resistant, controlled release fertilizer composition comprising the reacted moieties of Component A which is a water-soluble central mass of plant food compound in particulate form containing reactive functional groups amounting to at least 10%; Component B which is a monomer-type component having reactive functionality; and Component C which is present as a water-insoluble polymeric sealing layer; said Components A, B and C being selected in order that the reactive functionality of Component B will react with the reactive functionality of each of Components A and C, and with the ratios of said Components A, B and C being selected whereby Component B is present in an amount sufficient to provide reaction sites for reaction with substantially all of the reactive functionality at the surface of said particles of Component A and to react with the reactive functionality on Component C, thereby forming particles of Component A having a sealing layer of Component C thereon and with Components A and C being chemically linked together through Component B.

2. The composition of claim 1 wherein said reactive functionality of Components A and C are nucleophilic reactive groups.

3. The composition of claim 2 wherein the nucleophilic reactive groups of Component A are —NH$_2$ groups.

4. The composition of claim 3 wherein Component B is a polyisocyanate and Component C includes hydroxy groups.

5. An attrition-resistant, controlled release fertilizer particle composition, comprising:
   (A) a water-soluble central mass of plant food compound containing nucleophilic functional groups amounting to at least 10 percent;
   (B) a base component, surrounding and chemically bonded to the central mass formed by reacting a molecular excess of a liquid polyfunctional electrophilic monomeric or oligomeric compound with the nucleophilic functional groups of the central mass; and
   (C) a water-insoluble sealing layer, surrounding and chemically bonded to said base component, formed by the reaction and polymerization of the excess polyfunctional electrophilic compound of the base component with an amount of anhydrous liquid organic nucleophilic monomeric or oligomeric compound.

6. An attrition-resistant, controlled release fertilizer particle composition, comprising:
   (A) a water-soluble central mass of plant food compound containing reactive functional groups amounting to at least 10 percent, and
   (B) a base component, surrounding and chemically bonded to the central mass formed by reacting a molecular excess of a polyfunctional monomeric-type compound with the reactive functional groups of the central mass, said base component having residual reactive functionality.

7. A stepwise method of producing an attrition-resistant particulate fertilizer comprising:
   (A) surrounding and chemically bonding particles of water-soluble fertilizer material, containing at least 10 percent reactive functional groups, with a base coating, by applying a molecular excess of a polyfunctional coupling agent to a mobile mass of the particles of fertilizer at a temperature between 30° C. and 160° C., and holding for a period of time between one and 60 minutes; and (B) surrounding and chemically bonding said base coating with a water-insoluble sealing layer by reaction and polymerization of the excess polyfunctional coupling agent of the base coating with a reactive material having functional groups reactive with the functional groups of said coupling agent to form a water-insoluble polymer, the ratio of functional groups on said reactive material and coupling agent being between 1 and 3, by applying the reactive material to a mobile mass of base coated particles at a temperature between 60° C. and 160° C., and holding for a period of time between one and 60 minutes.

* * * * *